(12) United States Patent
Kim (10) Patent No.: US 6,266,104 B1
(45) Date of Patent: Jul. 24, 2001

(54) METHOD FOR CONTROLLING MEMORY OF HDTV VIDEO DECODER

(75) Inventor: Jin Kyeong Kim, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/221,821

(22) Filed: Dec. 28, 1998

(30) Foreign Application Priority Data

Dec. 31, 1997 (KR) .................................. 97/80709

(51) Int. Cl.[7] ................................ H04N 5/14; H04N 9/64
(52) U.S. Cl. ...................... 348/714; 348/715; 348/716; 375/240.01; 345/531; 345/540
(58) Field of Search ..................... 348/701, 714, 348/715, 716, 718; 375/240.01, 240.11, 240.16, 240.25; 345/508, 511, 512, 517, 521, 531, 535, 536, 540, 545, 560; H04N 5/14, 9/64

(56) References Cited

U.S. PATENT DOCUMENTS

| 5,646,700 | * | 7/1997 | Park | 348/718 |
| 5,675,387 | * | 10/1997 | Hoogenboom et al. | 348/715 |
| 5,910,824 | * | 6/1999 | Yu | 348/714 |
| 5,912,676 | * | 6/1999 | Malladi et al. | 348/718 |
| 6,008,850 | * | 12/1999 | Sumihiro et al. | 348/714 |
| 6,088,047 | * | 7/2000 | Bose et al. | 348/716 |
| 6,104,752 | * | 8/2000 | Yamagishi | 348/715 |

OTHER PUBLICATIONS

Winzker, Marco et al., "Architecture and Memory Requirements for stand–alone and hierarchiacal MPEG2 HDTV–Decoders with Synchronous DRAMs", IEEE, 1995, pp. 609–612.

* cited by examiner

Primary Examiner—Reinhard J. Eisenzopf
Assistant Examiner—Brian P. Yenke
(74) Attorney, Agent, or Firm—Fleshner & Kim, LLP (57) ABSTRACT

A system and method of controlling a memory of an HDTV video decoder is disclosed which has a video bit stream write buffer, a bit stream read buffer, a motion compensate buffer, a store buffer and a display buffer and outputs request signals to read/write a data from/into an external memory every time it is needed in order to decode an input video bit stream. The method includes the steps of prioritizing the request signals output and sending an authorization signal in response to each of the request signals.

20 Claims, 6 Drawing Sheets

REFERENCE MB
FRAME DATA

MEMORY MAP

*Elapse time : #of rd cycles + 9clock

FIG. 10

*Elapse time : #of rd cycles + 8clock

METHOD FOR CONTROLLING MEMORY OF HDTV VIDEO DECODER

BACKGROUND OF THE INVENTION

1. Field of the Invention

The present invention relates to an HDTV video decoder and more particularly to a method for controlling a memory interface in the HDTV video decoder.

2. Description of the Related Art

Generally, digital TV provides a superior picture quality on the TV receiver for the viewers. As a result, a growing interest in digital TV broadcasting has cultivated many efforts to compress video data for transmission and reproduction. Typically, a moving picture expert group (MPEG2) is used as the algorithm to compress video signals. Having a high compression rate ranging from approximately $1/40$ to $1/60$, the MPEG2 algorithm enables digital data transmission of high quality through general broadcasting channels to entertain viewers at home.

However, a digital TV receiver also requires a video decoder to restore the compressed data into the original video data of high picture quality. The digital TV receiver requires an enhanced video decoder capable of processing the highly compressed data. Thus, the video decoder for a digital TV processes data at a rate of approximately 5 to 6 times greater than the general quality video decoder as well as larger memories in order to decode the video data of high picture quality.

Figure 1:
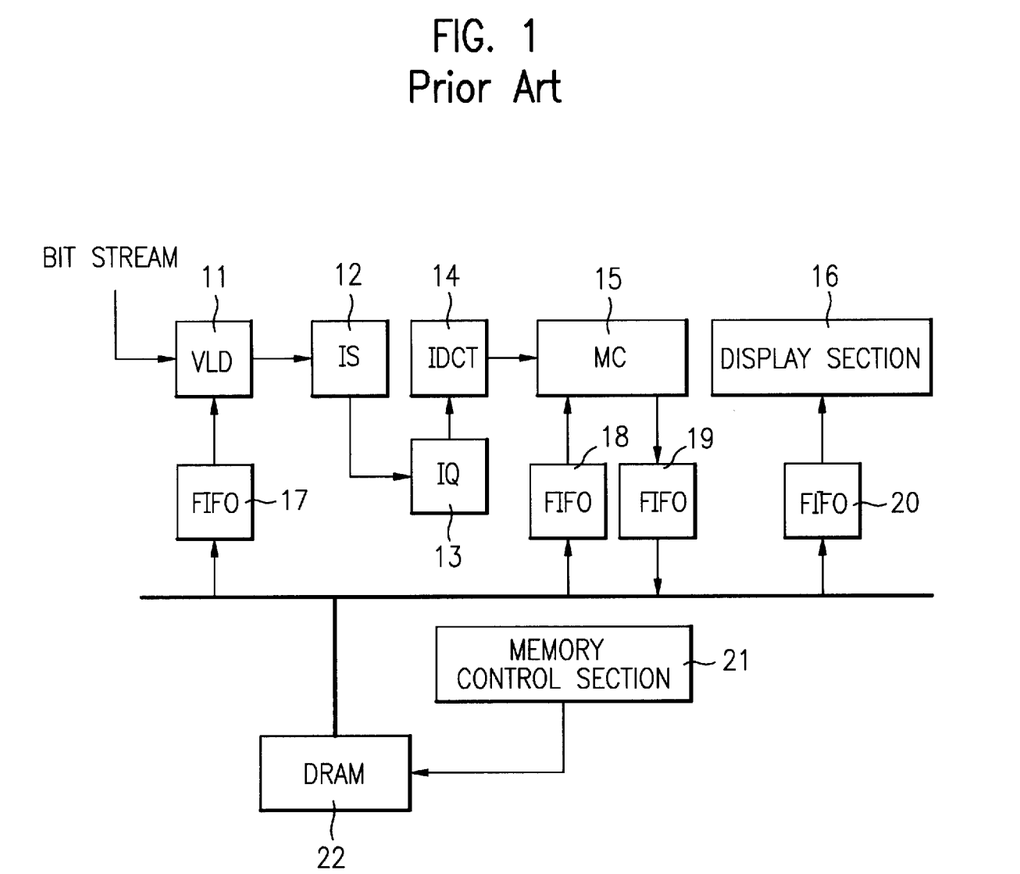
FIG. 1 is a block diagram of a general video decoder.

FIG. 1 shows a conventional video decoder in the related art designed to process video signals of normal resolution at a rate of approximately 15 MBytes per second. An input video bit stream transmitted by an encoder is variable length decoded at a variable length decoder (VLD) 11 and divided into a motion vector, a quantization value and a DCT coefficient. The DCT coefficient output by the VLD 11 is input to an inverse discrete cosine transformer (IDCT) 14 via an inverse scanner (IS) 12 and an inverse quantizer (IQ) 13.

The VLD 11 decodes the DCT coefficient into run levels. Particularly, one DCT block is composed of 8×8 coefficients, from which non-zero coefficients are the significant code information. The output run levels of the VLD 11 represent the size of the non-zero coefficients, namely the level and the number of zeros inserted between the non-zero coefficients. Accordingly, the run-level pair is converted to 64 continuous DCT coefficients by way of a run-level decoding process and output to the IS 12. In addition, to enhance the run-level code, the 8×8 coefficients are decoded in a zig-zagged scanning pattern during the data transmission from the lowest frequency component. Thus, the IS 12 converts the zigzagged scanning pattern to a raster scanning pattern.

The IQ 13 inverse-quantizes the inversed-scanned 64 DCT coefficients output from the IS 12 based on the quantization value, and outputs the result to the IDCT 14. The IDCT 14 performs IDCT on the inverse-quantized DCT coefficients and outputs the coefficients to a motion compensating section 15. The motion compensating section 16 restores the original picture using the video signals from the IDCT 14 and the motion vector separated from the VLD 11, and outputs the picture data to a display 16. Based upon the type of picture data, the display 16 rearranges the data prior to outputting the data or outputs the data directly without rearrangement.

The HDTV video decoder system based on the MPEG2 uses an external memory, composed of a buffer for temporarily storing a bit stream and at least two frame memories. Typically, DRAMs are used as frame memories. However, utilizing one memory for one IC is preferable in the construction of a decoder to reduce the number of pins and to efficiently utilize the remaining portion of the memory. To implement one memory for multiple uses, a variety of memory access request must be processed.

The memory in the video decoder has several roles including to read and write a bit stream, to read a data used for motion compensation, to write a decoded data, and to read a data to be displayed. Accordingly, the conventional video decoder includes a DRAM 22 and first in first outs (FIFOs) 17 to 20 for data transmission under the control of a memory control section 21 to prevent collisions among data in the bus in temporarily storing the data. The signals requested by the respective blocks are all require memory access to decode a video data and must be properly controlled for enhancing the decoding efficiency. Thus, the access time is divided for each access requests.

A conventional video decoder as shown in FIG. 1 has a low processing rate and may be suitable for processing a small amount of data, but it would be inapplicable as a HDTV video decoder which must process a large volume of data. Since the amount of data increases about 6 times for decoding a video data of the MPEG2 MP@HL, the data processing rate of the video decoder must be at least 93 MBytes per second. Moreover, other components must have a processing rate greater than 6 times the conventional video decoder shown in FIG. 1, with larger memory and higher data transmission rate.

Figure 2:
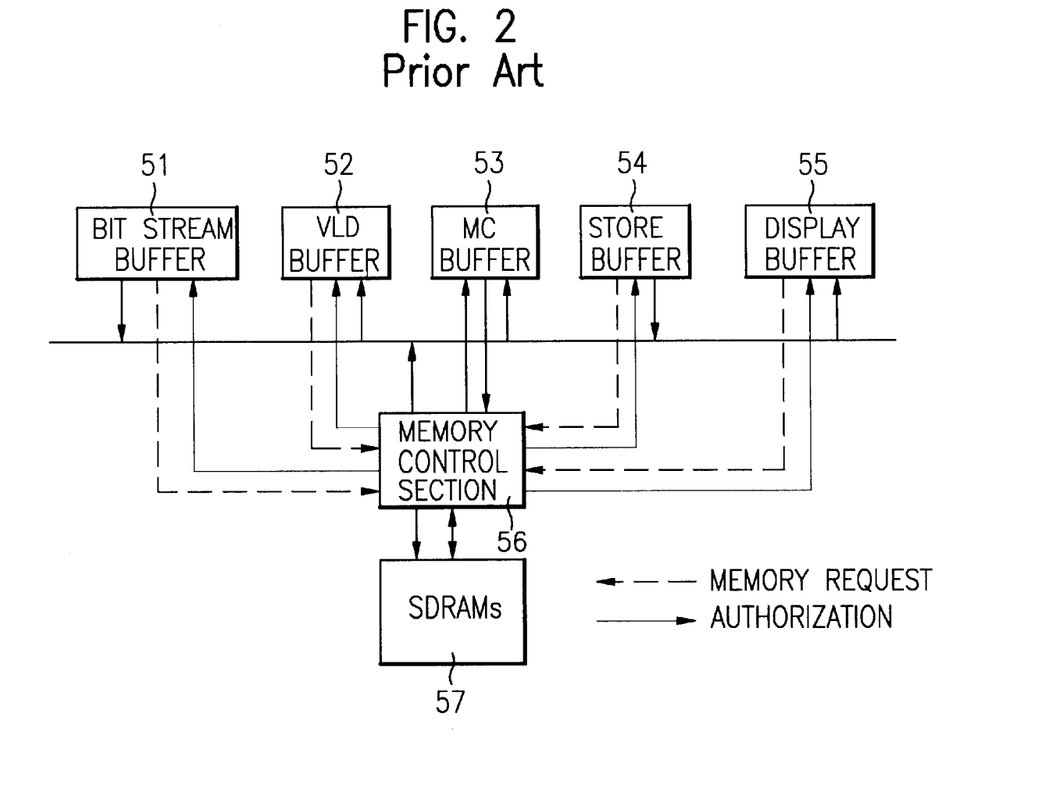
FIG. 2 is a block diagram of a video decoder using SDRAMs as an external memory.

FIG. 2 shows a video decoder that uses synchronous DRAMs (SDRAMS) capable of high speed memory access rather than using DRAMs as the external memory for greater data processing rate. The SDRAMs process input/output of data with higher processing rate relative to DRAMs because SDRAMS read/write the data in a pipe line by using an interleaving method.

The video decoder using the SDRAMS includes a bit stream buffer 51, a VLD buffer 52, MC buffer 53, a store buffer 54, and a display buffer 55 for the temporary data storage and communication rather than the FIFOs 17–20 used by the conventional video decoder using the DRAM. Also, the video decoder using the SDRAMS has a memory control section 56 to control the access of the buffers to the bus for the temporary storage of data.

Figure 3:
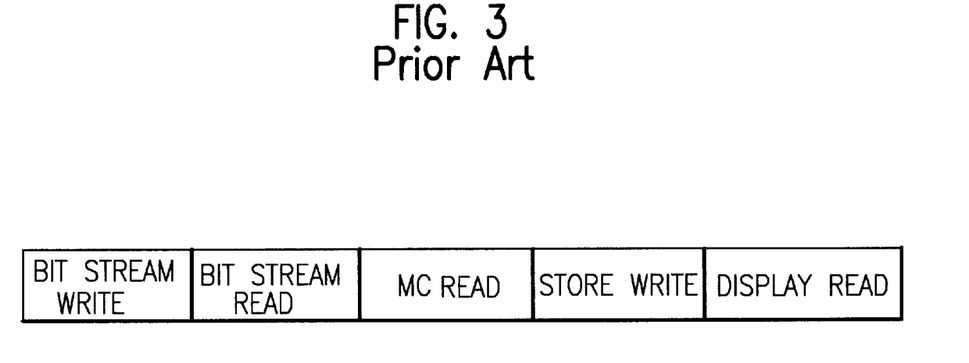
FIG. 3 is a diagram showing the processing order of a memory control section shown in FIG. 2.

The sequence of memory access required by the macro block units is allocated equally as shown in FIG. 3. However, the bit stream is not compressed by a fixed method, but is compressed by a method designed to suit each macro blocks. As a result, the amount of data required by each block differs. Thus, allocating access to the memory for the different amounts of data in fixed intervals would be inefficient because unnecessary memory access may be given. Moreover, access to a large amount of data at one time would reduce the time required to select the row and column addresses of the SDRAMs which are essential to the SDRAM 57 access.

For a HDTV decoder using frame memories as a external memory, the unit of data to be read out for motion compensation is too small resulting in a random address rather than a continuous address. Generally, access to the data in the SDRAMs 57 is by selecting a row address and shifting the column address as necessary. Unlike the column addresses, the addresses cannot be randomly shifted and must wait to access the data in a different row. Thus, the memories should be allocated in a way which allows access to the data from one row address, if possible.

Figure 4:
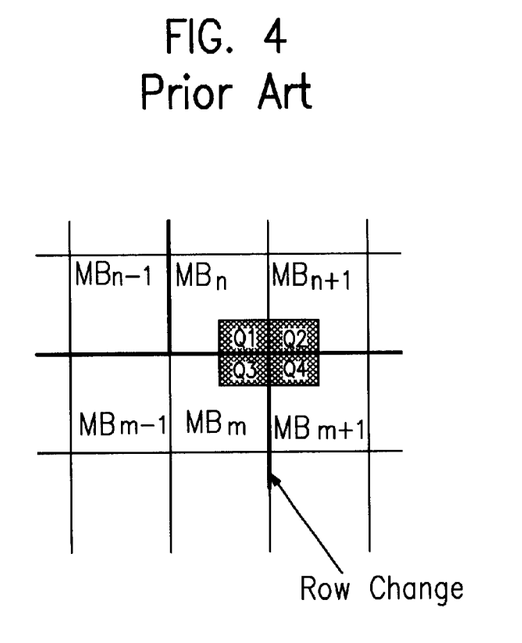
FIG. 4 is an example of a case where a motion compensation data is located across a plurality of row addresses.

To allow data access from one row, in case the data is for a HDTV, the data are typically stored in macro block units. However, one row address often is not large enough to store macro blocks located in the same horizontal direction. Consequently, contiguous macro blocks may be stored at a different row, and the memory access efficiency is lowered because of the necessity to select two row addresses in order to read out a data stored in two macro blocks. Furthermore, as illustrated in FIG. 4, contiguous macro blocks $MB_n$, $MB_{n+1}$, $MB_{m-1}$ to $MB_{m+1}$ may sometimes be stored across three row addresses indicated by the bold line, in which case the data access efficiency is further reduced because the row address must be shifted three times.

Figure 5:
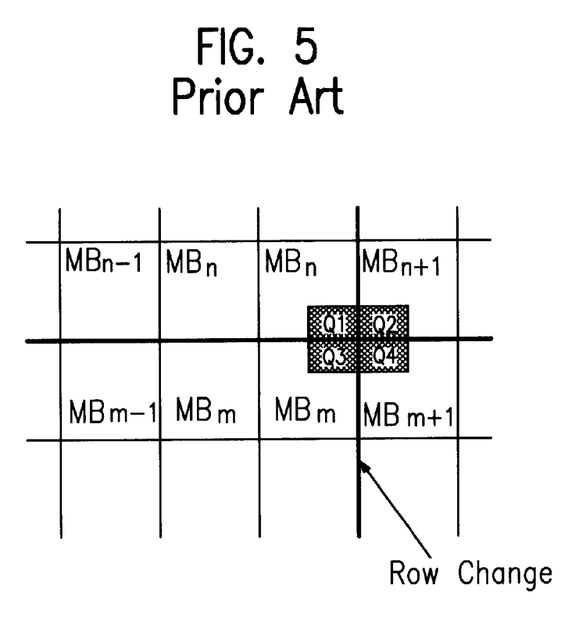
FIG. 5 is an example of a case where a motion compensation data is located across two row addresses due to a repeated storage of a macro block.

To improve data access, a method was suggested by Winzker, Pirsch, and Reimers in "Architecture and Memory Requirements for stand-alone and hierarchical MPEG2 HDTV-Decoders with synchronous DRAMs", IEEE International Symposium on circuits and Systems, Vol. 1, 1995, pp609–612, in which the macro blocks at the boundary area of two rows are repeatedly stored in two rows, as illustrated in FIG. 5. With this method, the macro blocks located at the boundary can be read out from one row, which enhances the memory access efficiency. However, this method is also ineffective when data to access is located across the upper and lower macro blocks because of a need to shift the row addresses, thereby deteriorating the memory access efficiency.

SUMMARY OF THE INVENTION

Accordingly, an object of the present invention is to solve at least the problems and disadvantages of the related art.

An object of the present invention is to provide external memories for a video decoder with an enhanced access rate to the memories.

Another object of the present invention is to provide a memory controlling method for allocating memories in order to reduce or minimize the time required to change row addresses in memory access for motion compensation.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method of controlling a memory of a video decoder comprises an SDRAM control section receiving the request signals output from the video bit stream write buffer, the bit stream read buffer, the motion compensate buffer, the store buffer and the display buffer; sends an authorization signal in response to each of the request signals; and imposes priorities on the responses to the request signals in the order of bit stream write buffer, display buffer, bit stream read buffer, store buffer and motion compensate buffer.

In another embodiment of the present invention, a synchronous DRAM (SDRAM) is allocated to the external memory in such a manner that the upper and lower slices have bank addresses different from each other, and a data used for motion compensation and located across two slices is read out from the SDRAM by way of an SDRAM interleaving access method.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

Figure 6:
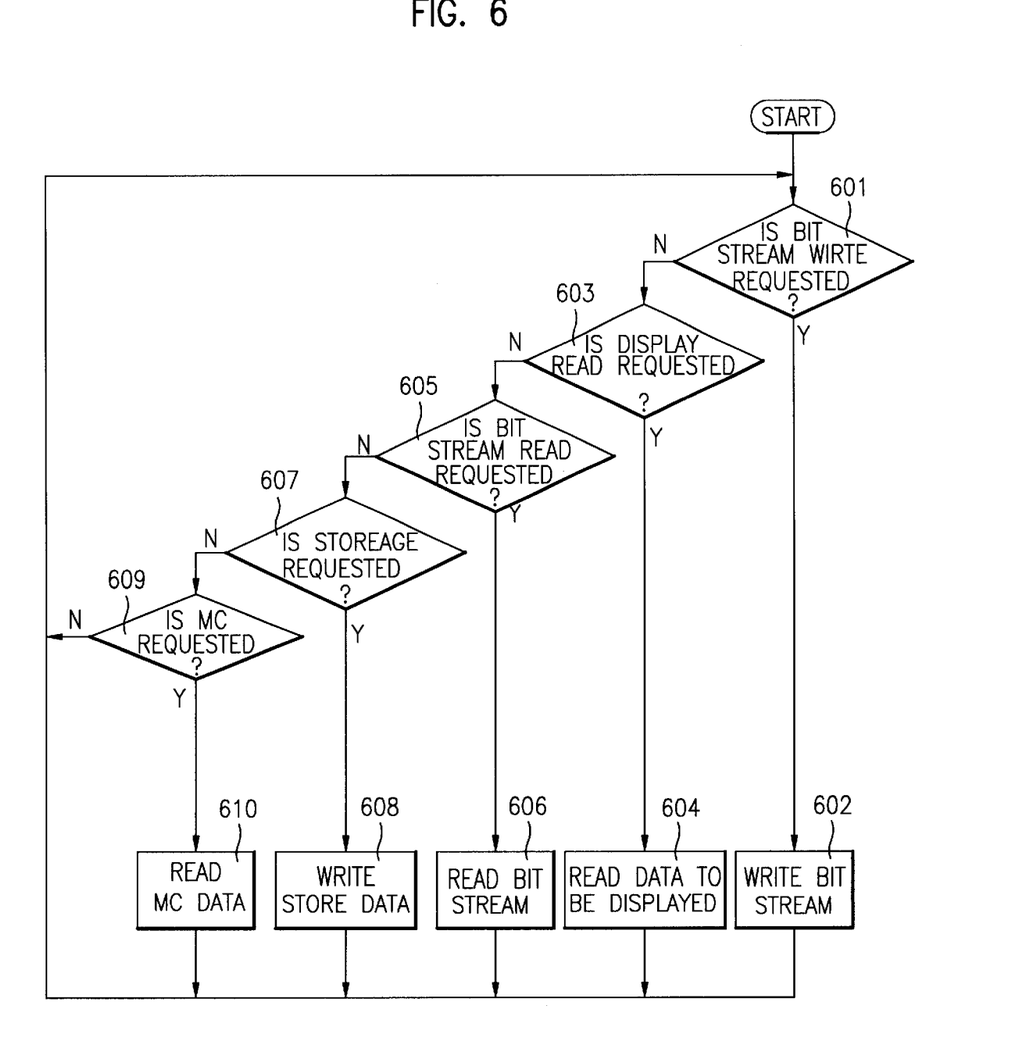
FIG. 6 is a flow chart illustrating a method for processing memory request signals by the memory controller according to the present invention.

FIG. 6 is a flow chart illustrating a procedure of processing memory requests received from different decoding blocks according to the present invention. The memory requests are processed under the control of a memory controller in a designated order, in which a read/write request signal from each block input to a memory control section 56 shown in FIG. 2 is processed.

A bit stream buffer 51 shown in FIG. 2 sends a request signal used to write a bit stream to the memory control section 56 in order to convert a variable rate to a fixed rate before the VLD. A VLD buffer 52 inputs a request signal used to read the bit stream stored in an SDRAM 57 to the memory control section 56 to perform the VLD. An MC buffer 53 sends a memory request signal needed for motion compensation, a store buffer 54 sends a request signal used to store a decoded macro block, and a display buffer 55 sends a memory request signal needed for display. Rather than processing a single request signal, the entire processing rate may be determined by the order of the request signals to be processed.

Referring back to FIG. 6, a judgement is formed as to whether or not a bit stream write request exists (step 601). If the bit stream write request exists, the memory control section 56 outputs an authorization signal and writes the bit stream input to the SDRAM 57 (step 602).

If no bit stream request exists, a judgement is formed as to whether or not a display read request exists (step 603). If the output of the judgement made in step 603 indicates that a display read request exists, the memory control section 56 outputs an authorization signal and reads a data needed for display from the SDRAM 57 (step 604).

If there is no display read request, a judgement is formed as to whether a bit stream read request exists (step 605). If the output of the judgement formed in step 605 indicates that there is a bit stream read request, the memory control section 56 outputs an authorization signal and reads a data needed for VLD from the SDRAM 57 (step 606).

If there is no bit stream read request, a judgement is formed as to whether or not a motion-compensated data store request exists (step 607). If the motion-compensated data store request exists, the memory control section 56 outputs an authorization signal and store the motion-compensated data in the SDRAM 57 (step 608).

If no motion-compensated data store request exists, a judgement is formed as to whether or not there is a read request for motion compensation (step 609). If the output of the judgement formed in step 609 indicates that the read request for motion compensation exists, the memory control section 56 outputs an authorization signal and reads a data needed for motion compensation from the SDRAM 57 (step 610). If there is no read request for motion compensation, the process returns to step 601.

In the present invention, the simultaneous input of memory request signals are prioritized a first criteria based upon a signal which needs to be processed and a second criteria based upon frequency of use. Particularly, the video decoder first receives and stores an input bit stream, and then reads the stored bit stream to decode.

The input bit stream should not be interrupted because damages may occur if the input bit stream is not processed in a timely manner. Thus, a priority must first be imposed on the memory request for processing the input bit stream. The next priority is given to the memory request for processing a data to be displayed, which has to be output periodically. Thereafter, a memory request for video bit stream is the next priority because data needed by the VLD block for reading the video bit stream to be decoded is a compressed data which does not have a large size, and occurs often. The memory request of the lowest priority is a memory request for motion compensation because the data used for motion compensation is a large-sized and frequently occurring data which does not cause a significant problem even if somewhat delayed.

Figure 7:
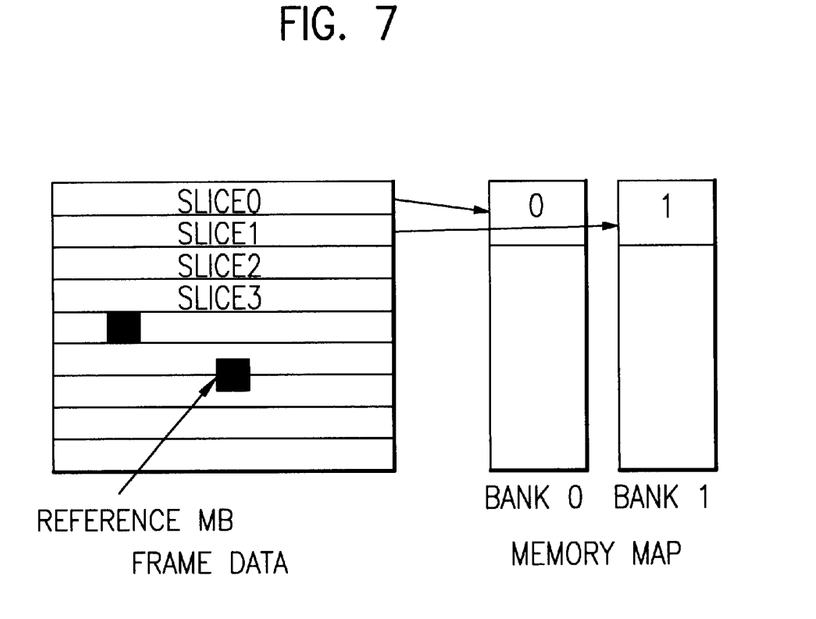
FIG. 7 is an SDRAM memory map of the present invention.

Imposing priorities on the memory requests makes it possible to prevent a problem involving a decrease in the decoding rate caused by not processing the memory requests. Moreover, as shown in FIG. 7, the SDRAM is composed of two banks therein, each of which can be activated independently. An access to a data corresponding to two row addresses from one bank takes less time than an access to a data stored in both banks. Based on this fact, it is also possible to reduce the time for reading a data needed for motion compensation which are located on the upper and lower slices on the frame.

Figure 8:
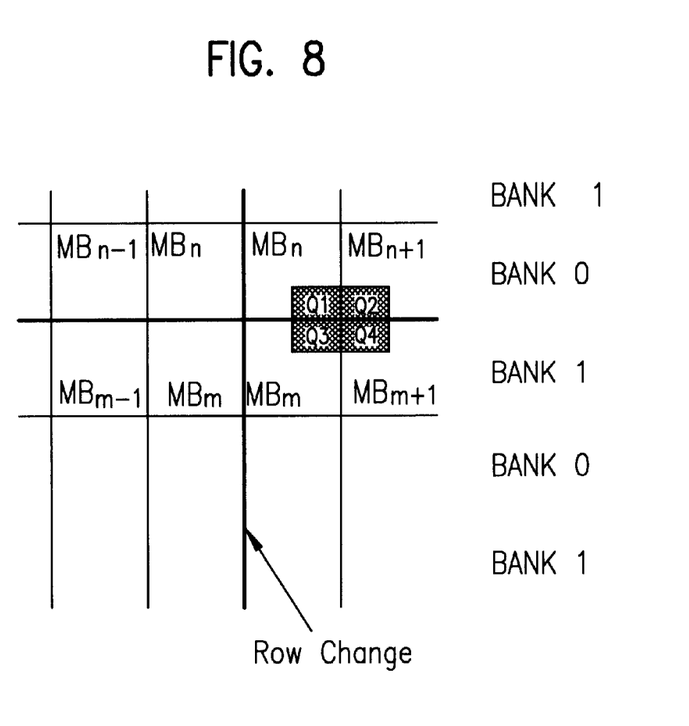
FIG. 8 is an example of a case where slices are allocated to different banks.

FIG. 8 shows the position of a data to be read out for motion compensation from a memory in connection with the memory map shown in FIG. 7. The data is located at the same row address in the horizontal direction and at different bank addresses vertically. The time required to read out the data can be reduced by reading the data from the SDRAM by an interleaving method rather than reading the data on the upper and lower blocks independently.

Figure 9:
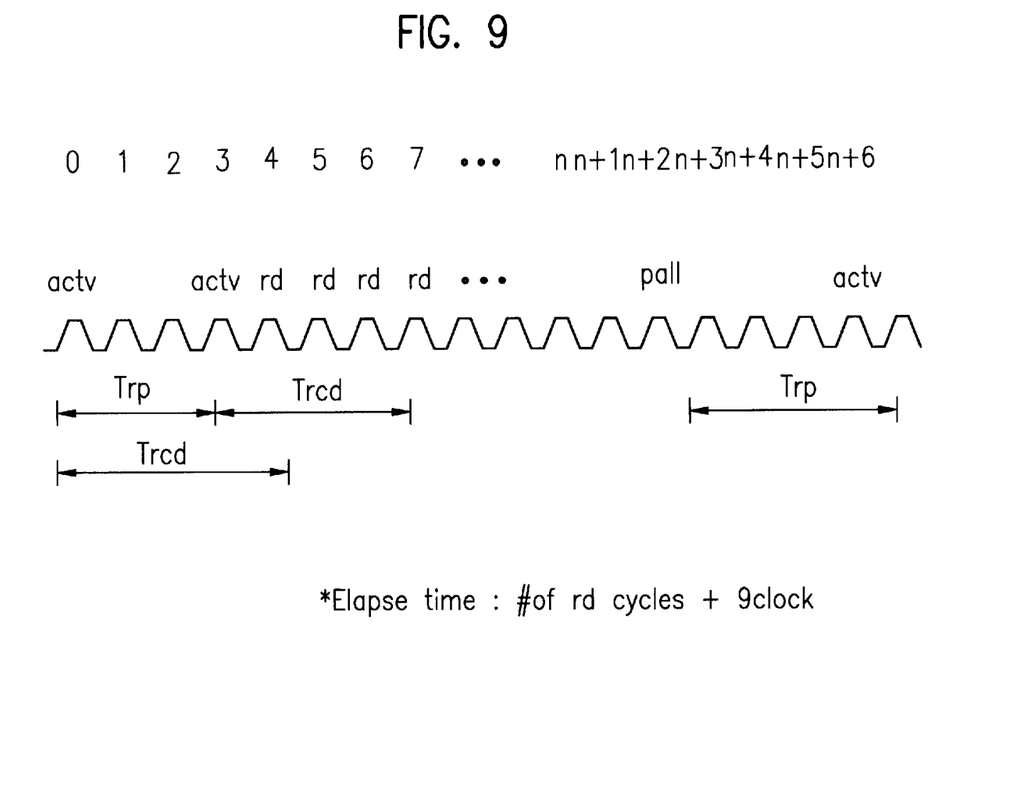
FIG. 9 is a memory interface timing diagram in reading out each block from dual banks.
Figure 10:
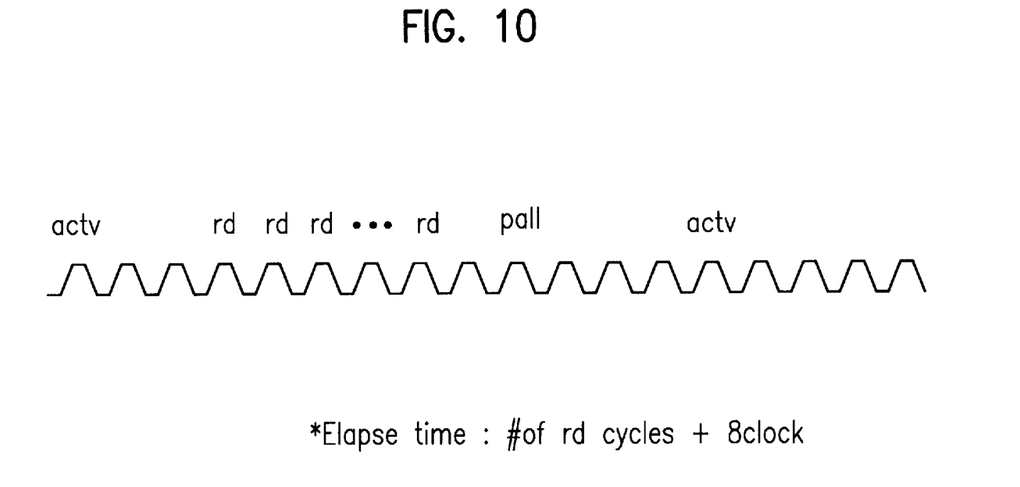
FIG. 10 is a memory interface timing diagram in reading out each block from a single bank.

FIGS. 9 and 10 compares using a dual bank to using a single bank. For a single bank, reading out a data from one bank takes 8 clocks more in addition to the amount of data to be read out. Thus, 16 clocks are added to the amount of data to read out in reading a data of different row addresses in the same bank. However, 9 clocks are added to the amount of data to read out when reading two block data located in different banks by a dual bank access method. Consequently, 7 clocks can be saved in access to the memories, reducing the access time.

As described above, an apparatus for controlling memories of an HDTV video decoder according to the present invention can decode a data at high processing rate with increased interfacing speed with the external memory due to efficient memory access by imposing priorities on bit stream write buffer, display buffer, bit stream read buffer, store buffer, and motion compensate buffer in order.

Furthermore, the SDRAMs are allocated to the frame memories in such a manner that the upper and lower slices are positioned in different bank addresses from each other. The data used for motion compensation positioned across two slices can be read out by a SDRAM interleaving access memory, enhancing the memory access efficiency for HDTV decoding process.

The present invention is also applicable to an IC design of HDTV and digital TV receivers with powerful effects.

The foregoing embodiments are merely exemplary and are not to be construed as limiting the present invention. The present teachings can be readily applied to other types of apparatuses. The description of. the present invention is intended to be illustrative, and not to limit the scope of the claims. Many alternatives, modifications, and variations will be apparent to those skilled in the art.

What is claimed is:

1. A method of controlling a memory of a video decoder having a bit stream write buffer, a bit stream read buffer, a motion compensate buffer, a store buffer and a display buffer, the method comprising:

receiving memory request signals from the bit stream write buffer, the bit stream read buffer, the motion compensate buffer, the store buffer and the display buffer;

sending an authorization signal in response to each of the received memory request signals; and setting priorities on the authorization signal responses to said each of the memory request signals in the pre-scribed order of the bit stream write buffer, the display buffer, the bit stream read buffer, the store buffer and the motion compensate buffer.

2. The method of claim 1, further comprising allocating the SDRAM to the external memory in a manner in which the upper and lower slices have different bank addresses.

3. The method of claim 2, further comprising utilizing the SDRAM interleaving access method to read out data for motion compensation from the SDRAM when the data is located across two slices.

4. The method of claim 1, wherein each of the priorities is set using a first criteria based upon a memory request signal that must be processed in a timely manner, and wherein said each of the priorities is set using a second criteria based upon a frequency of the memory request signal.

5. The method of claim 1, wherein a pending response to the bit stream write buffer is performed before a pending response to the display buffer, wherein the pending response to the display buffer is performed before a pending responses to the bit stream read buffer, wherein the pending response to the bit stream read buffer is performed before a pending response to the store buffer, and wherein the pending response to the store buffer is performed before a pending response to the motion compensate buffer.

6. A method of controlling a memory of a video decoder having a plurality of buffers to access the memory, the method comprising:

receiving memory request signals from at least one of the plurality of buffers;

setting a priority on the plurality of buffers; and sending an authorization signal in response to each memory request signals according to the set priority, wherein in the setting the priority, the priority is set using a first criteria based upon the memory request signal which must be processed in a timely manner, and wherein the priority is set using a second criteria based upon a frequency of the memory request signal.

7. A method of claim 4, wherein the first priority is given to a bit stream write buffer.

8. A method of claim 7, wherein the second priority is given to a display buffer.

9. A method of claim 8, wherein the third priority is given to a bit stream read buffer.

10. A method of claim 9, wherein the fourth priority is given to a store buffer.

11. A method of claim 4, wherein a motion compensate buffer is given the last priority.

12. The method of claim 6, further comprising allocating the SDRAM to the external memory in a manner in which the upper and lower slices have different bank addresses.

13. The method of claim 12, further comprising utilizing the SDRAM interleaving access method to read out data for motion compensation from the SDRAM when the data is located across two slices.

14. A video decoder for controlling memory access comprising:
    an external memory receiving and temporarily storing bit stream;
    a plurality of buffers sending a memory request signal to access the external memory; and
    a memory control section receiving the memory request signals and sending an authorization signal in response to each memory request signal according to a predetermined priority, wherein the priority is set using a first criteria based upon the memory request signal, which must be processed in a timely manner, and wherein the priority is set using a second criteria based upon a frequency of the memory request signal.

15. A system of claim 6, wherein the first priority is given to a bit stream write buffer sending a memory request signal to write an input bit stream to the external memory.

16. A system of claim 15, wherein the last priority is given to a MC buffer sending a memory request signal to the external memory for motion compensation.

17. A system of claim 6, wherein the external memory is a SDRAM.

18. A system of claim 17, wherein the upper and lower slices of the SDRAM have different bank addresses and the MC buffer utilizes the SDRAM interleaving access method to read out data for motion compensation from the SDRAM when the data is located across two slices.

19. A method of controlling a memory of a video decoder having a plurality of buffers to access the memory, the method comprising:
    receiving and temporarily storing a bit stream in a memory;
    receiving memory request signals from at least one of the plurality of buffers to access the memory;
    setting a prescribed priority on the plurality of buffers; and
    sending an authorization signal in response to each of the memory request signals according to the prescribed priority, wherein the prescribed priorities are set using a first criteria and a second criteria based upon the memory request signal, wherein the second criteria is different than the first criteria.

20. The method of claim 19, wherein the second criteria is set based upon a frequency of the memory request signal.

* * * * *